(12) United States Patent
Bohling et al.

(10) Patent No.: US 9,828,509 B1
(45) Date of Patent: Nov. 28, 2017

(54) POLYMER ENCAPSULATED TIO2 COATING FORMULATION

(71) Applicant: Rohm and Haas Company, Philadelphia, PA (US)

(72) Inventors: James C. Bohling, Lansdale, PA (US); David G. Kelly, Ambler, PA (US); Pu Luo, King of Prussia, PA (US); Yogesh Tiwary, Bangalore (IN)

(73) Assignee: Rohm and Haas Company, Philadelphia, PA (US)

( * ) Notice: Subject to any disclaimer, the term of this patent is extended or adjusted under 35 U.S.C. 154(b) by 37 days.

(21) Appl. No.: 15/196,099

(22) Filed: Jun. 29, 2016

(51) Int. Cl.
| | | |
|---|---|---|
| *C09D 7/12* | (2006.01) | |
| *C09D 133/06* | (2006.01) | |
| *C08K 3/22* | (2006.01) | |
| *C08K 5/25* | (2006.01) | |

(52) U.S. Cl.
CPC ......... *C09D 7/1216* (2013.01); *C09D 7/1233* (2013.01); *C09D 133/06* (2013.01); *C08K 3/22* (2013.01); *C08K 5/25* (2013.01); *C08K 2003/2241* (2013.01)

(58) Field of Classification Search
CPC .. C09D 7/1216; C09D 7/1233; C09D 133/06; C08K 3/22; C08K 5/25; C08K 2003/2241
USPC .......................................................... 524/192
See application file for complete search history.

(56) References Cited

U.S. PATENT DOCUMENTS

| | | |
|---|---|---|
| 8,283,404 B2 | 10/2012 | Allen et al. |
| 2010/0298483 A1 | 11/2010 | Allen et al. |
| 2011/0251304 A1 | 10/2011 | Brown |
| 2014/0011943 A1 | 1/2014 | Bardman et al. |
| 2014/0121305 A1 | 5/2014 | Brown et al. |

*Primary Examiner* — Angela C Scott
(74) *Attorney, Agent, or Firm* — Reid S. Willis

(57) ABSTRACT

The present invention is a composition comprising a) an aqueous dispersion of $TiO_2$ particles encapsulated with an encapsulating acrylic or styrene-acrylic polymer comprising from structural units of diacetone acrylamide; and b) adipic acid dihydrazide. The composition is useful in coatings applications and shows a surprising improvement in gloss over compositions that do not include diacetone acrylamide functionalized encapsulating polymer and adipic acid dihydrazide.

3 Claims, No Drawings

POLYMER ENCAPSULATED TIO2 COATING FORMULATION

BACKGROUND OF THE INVENTION

The present invention relates to a polymer encapsulated $TiO_2$ coating formulation and its preparation, more particularly a coating formulation exhibiting improved gloss.

Opacifying pigments such as $TiO_2$ are used in coating formulations to provide whiteness and opacity (hiding) to conceal the substrate upon which the coating is applied. Formulators desire to maximize hiding while minimizing the amount of opacifying pigment used in the formulation. To that end, the development of an efficient composition for polymer encapsulated $TiO_2$ particles by Allen et al. (U.S. Pat. No. 8,283,404) represents a significant advance in improving the efficiency of spacing of $TiO_2$ particles in coating formulations. Subsequently, Bardman et al. (US 2014/0011943) improved upon the discovery of Allen et al. with a process for preparing a virtually grit free aqueous dispersion of $TiO_2$ encapsulating with polymer that is film-forming at ambient temperature.

Although hiding efficiency has been significantly improved, one of the ongoing concerns with formulations containing polymer encapsulated $TiO_2$ particles is gloss development over formulations that do not use encapsulation technology: Larger composite particles give inherently lower gloss than their unencapsulated counterparts. Accordingly, it would be desirable to find a way to improve gloss in coating compositions containing polymer encapsulated $TiO_2$ particles.

SUMMARY OF THE INVENTION

The present invention addresses a need in the art by provide a composition comprising a) an aqueous dispersion of $TiO_2$ particles encapsulated with an encapsulating acrylic or styrene-acrylic polymer, and from 0.5 to 5 weight percent structural units of diacetone acrylamide, based on the weight of the encapsulating polymer; and b) from 0.2 to 3 weight percent adipic acid dihydrazide, based on the weight of the encapsulating polymer. The composition of the present invention provides improved gloss over similar compositions that do not contain diacetone acrylamide groups in the encapsulating polymer and adipic acid dihydrazide in the aqueous phase of the stable aqueous dispersion.

DETAILED DESCRIPTION OF THE INVENTION

The present invention is a composition comprising a) an aqueous dispersion of $TiO_2$ particles encapsulated with an encapsulating acrylic or styrene-acrylic polymer comprising from 0.5 to 5 weight percent structural units of diacetone acrylamide, based on the weight of the encapsulating polymer; and b) from 0.2 to 3 weight percent adipic acid dihydrazide, based on the weight of the encapsulating polymer.

Encapsulation of $TiO_2$ with acrylic or styrene-acrylic encapsulating polymer can be accomplished in a variety of ways including those methods described in U.S. Pat. No. 8,283,404 and US 2014/0011943. The encapsulating acrylic or styrene-acrylic polymer is preferably film-forming at room temperature; that is to say, the nature and relative concentrations of monomers are selected to yield polymers having a $T_g$ of preferably not more than 20° C., more preferably not more than 10° C., and most preferably not more than 0° C.; and preferably not less not less than –40° C., and more preferably not less than –30° C., as determined by Fox equation. (See Bulletin of the American Physical Society 1, 3 Page 123 (1956)). One of ordinary skill in the art would be able to prepare polymers at a desired $T_g$.

As used herein, the term "acrylic or styrene-acrylic encapsulating polymer" refers to a polymer that comprises from 30% to 99.5% by weight structural units of one or more acrylate or methacrylate monomers or from 30% to 99.5% by weight structural units of styrene and one or more acrylate or methacrylate monomers. As used herein, "structural unit" refers to the remnant of recited monomer post polymerization. A structural unit of methyl methacrylate is illustrated:

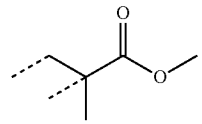

structural unit of methyl methacrylate where the dotted lines represent the points of attachment of the structural unit to the polymer backbone.

Monomers used to prepare the encapsulating acrylic or styrene-acrylic polymer preferably include a) methyl methacrylate or styrene or a combination thereof, and b) ethyl acrylate, butyl acrylate, or ethylhexyl acrylate or a combination thereof. Other ancillary monomers suitable in the preparation of the encapsulating polymer include carboxylic acid containing monomers such as acrylic acid, methacrylic acid, or itaconic acid; sulfonic acid monomers or salts thereof such as 2-acrylamido-2-methylpropanesulfonic acid and sodium styrene sulfonate; and crosslinking monomers such as allyl methacrylate and divinyl benzene.

A critical feature of the acrylic or styrene-acrylic encapsulating polymer encapsulating polymer is the presence of from 0.5, preferably from 1 weight percent, to 5 preferably to 3 weight percent structural units of diacetone acrylamide, based on the weight of the encapsulating polymer.

The composition of the present invention further includes from 0.2, preferably from 0.5 weight percent, to 3, preferably to 1.5 weight percent adipic acid dihydrazide, based on the weight of the encapsulating polymer.

The composition of the present invention is useful in coating formulations and can be admixed with one or more of the following materials: dispersants, defoamers, surfactants, solvents, additional binders, thickeners, extenders, coalescents, biocides, and colorants. It has been surprising discovered that aqueous coating compositions comprising adipic acid dihydrazide and $TiO_2$ particles encapsulated with acrylic or styrene-acrylic encapsulating polymer functionalized with structural units of diacetone acrylamide exhibit improved gloss as compared with compositions that do not contain adipic acid dihydrazide and comprise $TiO_2$ particles encapsulated with an acrylic or styrene-acrylic encapsulating polymer that is not functionalized with structural units of diacetone acrylamide.

In the following examples, the $TiO_2$-disperant slurry was prepared substantially as disclosed in US Pat. Pub. 20100/298483, page 7, paragraph 0053, and page 8, paragraph 0059.

EXAMPLES

Comparative Example 1—Preparation of Polymer Encapsulated TiO$_2$ Composite Without Post Polymerization Crosslinking A Monomer Emulsion (ME) was prepared by mixing water (60 g), BIO-SOFT S-101 surfactant (6.5 g, neutralized with ammonia, 25% aqueous solution), methacrylic acid (0.84 g), sodium styrene sulfonate (0.84 g), butyl acrylate (150.11), methyl methacrylate (126.21 g), ureido methacrylate (7 g), and benzophenone (4.2 g, 40% solution in butyl acrylate).

To a four-necked 2-L round bottom flask equipped with a mechanical paddle stirrer, a thermocouple, N$_2$ inlet, and reflux condenser was added TiO$_2$-dispersant slurry (479.45 g) and water (30 g). The mixture was heated to 50° C. under N$_2$; to the flask was sequentially added a premixed aqueous solution of BIO-SOFT S-101 surfactant (3.36 g, neutralized with ammonia, 25% aqueous solution) in water (20 g), a premixed aqueous solution of sodium styrene sulfonate (0.74 g in 20 g water), a mixture of an aqueous solution of iron sulfate heptahydrate (6.53 g, 0.10% iron), and an aqueous solution ethylenediaminetetraacetic acid (EDTA, 0.28 g, 1%). A solution of t-butyl hydrogen peroxide (0.77 g in 60 g water) and a solution of isoascorbic acid (0.46 g in 60 g water) were fed to the flask at a rate of 0.65 g/min. After 3 min, ME was fed to the reactor at a rate of 5 g/min and the flask temperature was allowed to exotherm to 65° C. and maintained at that temperature. After completion of ME addition, the monomer emulsion vessel was rinsed with deionized water (5 g), which was added to the flask. The cofeed catalyst and activator addition was continued until completion. After completion of all feeds, the flask was cooled to room temperature. When the flask temperature reached 45° C., an aqueous solution of ACRYSOL™ ASE-60 Thickener (5.5 g in 10 g water, A Trademark of The Dow Chemical Company or Its Affiliates) was added to the flask at a rate of 1.5 g/min, followed by the addition of a solution of 29% aqueous ammonium hydroxide (2 g) and water (2 g) at a rate of 0.4 g/min, and a solution of ROCIMA™ BT 2S Biocide (2.6 g, A Trademark of The Dow Chemical Company or Its Affiliates) and water (6 g) at a rate of 0.5 g/min.

After the flask was cooled to room temperature, the contents were filtered to remove any gel. The filtered dispersion was found to have a solids content of 58.3% with a pH of 9.0.

Example 1—Preparation of Polymer Encapsulated TiO$_2$ Composites With Post-Polymerization Crosslinking The Monomer Emulsion (ME) was prepared by mixing water (60 g), Polystep A-16-22 surfactant (7.22 g), methacrylic acid (0.84 g), sodium styrene sulfonate (0.84 g), diacetone acrylamide (5.6 g), butyl acrylate (150.11), methyl methacrylate (120.68 g), ureido methacrylate (7 g), and benzophenone (4.2 g, 40% solution in butyl acrylate).

To a four-necked 2-L round bottom flask equipped with a mechanical paddle stirrer, a thermocouple, N$_2$ inlet, and reflux condenser was added TiO$_2$-polymer slurry (479.45 g) and water (30 g). The mixture was heated to 50° C. under N$_2$, whereupon to the flask was sequentially added a premixed aqueous solution of Polystep A-16-22 surfactant (3.73 g in 20 g water), a premixed aqueous solution of sodium styrene sulfonate (2.91 g in 20 g water), a mixture of an aqueous solution of iron sulfate heptahydrate (6.53 g, 0.10% iron), and an aqueous solution of EDTA (0.28 g, 1%). A solution of t-butyl hydrogen peroxide (3.08 g in 60 g water) and a solution of isoascorbic acid (1.82 g in 61 g water) were fed to the flask at a rate of 0.65 g/min. After 3 min, ME was fed to the reactor at a rate of 5 g/min and the flask temperature was allowed to exotherm to 65° C. and controlled at that temperature. After completion of ME addition, the monomer emulsion vessel was rinsed with 5 g deionized water, which was added to the flask. The cofeed catalyst and activator addition was continued until completion. After completion of all feeds, the flask was cooled to room temperature. When the flask temperature reached 45° C., an aqueous suspension of adipic acid dihydrazide (2.8 g in 10 g water) was added to the flask, followed by the addition of a solution of 29% aqueous ammonium hydroxide (1 g) and water (2 g) at a rate of 0.4 g/min, and a solution of ROCIMA™ BT 2S Biocide (2.6 g) and water (6 g) at a rate of 0.5 g/min.

After the flask was cooled to room temperature, the contents were filtered to remove any gel. The filtered dispersion was found to have a solids content of 58.4% with a pH of 8.0.

Coatings Formulations from Example 1 and Comparative Example 1

Table 1 shows the additives used to form 18.0% (Paints 1 and 2) and 14.4% (Paints 3 and 4) pigment volume concentration (PVC) coatings formulations.

| Abbreviations | |
| --- | --- |
| Abbreviation | Product Name |
| Acrylic Binder | RHOPLEX ™ HG-706 Acrylic Binder |
| Surfactant | TERGITOL ™ 15-s-40 Surfactant |
| Defoamer | Foamstar A-34D Defoamer |
| Coalescent | Texanol Coalescent |
| RM1 | ACRYSOL ™ RM-2020 NPR Rheology Modifier |
| RM2 | ACRYSOL ™ RM-8W Rheology Modifier |

RHOPLEX, TERGITOL, and ACRYSOL are all Trademarks of The Dow Chemical Company or Its Affiliates.

TABLE 1

Coatings Formulations Containing Polymer Encapsulated TiO$_2$ Composite

| Ingredients (in lbs) | Paint 1 | Paint 2 | Paint 3 | Paint 4 |
| --- | --- | --- | --- | --- |
| Comparative Example 1 | 677.53 | | 559.16 | |
| Example 1 | | 683.15 | | 563.80 |
| Acrylic Binder | 215.15 | 206.45 | 331.65 | 324.47 |
| Surfactant | 1.93 | 1.93 | 1.99 | 1.99 |
| Defoamer | 1.16 | 1.16 | 1.19 | 1.19 |
| Coalescent | 13.93 | 13.93 | 15.00 | 15.00 |
| Water | 62.84 | 65.92 | 62.66 | 65.21 |
| RM1 | 25.35 | 25.35 | 26.15 | 26.15 |
| RM2 | 2.12 | 2.12 | 2.19 | 2.19 |
| Total | 1000.00 | 1000.00 | 1000.00 | 1000.00 |

Gloss Measurements

The formulated paint samples were applied to a Leneta white chart (form WB) with a 3-mil Bird applicator. The samples were allowed to dry for 24 h, and the gloss was measured with a Micro-TRI-gloss meter from BYK Gardner.

Hiding (S/mil) was measured by the Kubelka-Munk Test Method as follows:

Kubelka-Munk S/mil Test Method

Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The y-reflectance was measured using a BYK Gardner 45° Reflectomer in each of the scribed areas five times measuring on a diagonal starting at the top of the rectangle and the average y-reflectance recorded. A thick film draw down was prepared for each paint on Black Vinyl Charts (Leneta Form P121-10N) using a 3" 25 mil block draw down bar and the charts were allowed to dry overnight. The y-reflectance was measured in five different areas of the draw down and the average y-reflectance recorded. Kubelka-Munk hiding value S is given by Equation 1:

$$S = \frac{R}{X \times (1 - R^2)} \times \ln \frac{1 - (R_B \times R)}{1 - \frac{R_B}{R}} \quad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in².

$$X(mils) = \frac{W_{Rf}(g) \times 1000(\text{mil/in})}{D(\text{lbs/gal}) \times 1.964(g/in^3 / \text{lbs/gal}) \times A(in)}$$

Table 2 illustrates the hiding and gloss for the four paint samples. Gloss was measured after 1 day at 20° and 60°.

TABLE 2

Hiding and Gloss Results

| Paint No. | 1 | 2 | 3 | 4 |
|---|---|---|---|---|
| Hiding (S/mil) | 6.94 | 6.69 | 5.95 | 5.81 |
| Stdev | 0.11 | 0.02 | 0.02 | 0.03 |
| Gloss (1-d) 20° | 31.4 | 53.8 | 42.7 | 55.0 |
| Gloss (1-d) 60° | 64.8 | 73.4 | 71.7 | 75.7 |

As Table 2 shows, the paints made using the composite particles from Example 1 (Paints 2 and 4) show a marked improvement in 20° gloss and a statistically significant improvement in 60° gloss without a substantial loss in hiding.

The invention claimed is:

1. A composition comprising a) an aqueous dispersion of $TiO_2$ particles encapsulated with an encapsulating acrylic or styrene-acrylic polymer comprising from 0.5 to 5 weight percent structural units of diacetone acrylamide, based on the weight of the encapsulating polymer; and b) from 0.2 to 3 weight percent adipic acid dihydrazide, based on the weight of the encapsulating polymer.

2. The composition of claim 1 wherein the encapsulating acrylic or styrene-acrylic polymer has a calculated $T_g$ of from −30° C. to 20° C.

3. The composition of claim 2 wherein the encapsulating acrylic or styrene-acrylic polymer comprises from 1 to 3 weight percent structural units of diacetone acrylamide, based on the weight of the encapsulating polymer; and wherein the composition comprises from b) from 0.5 to 1.5 weight percent adipic acid dihydrazide, based on the weight of the encapsulating polymer.

* * * * *